(12) United States Patent
Ito et al.

(10) Patent No.: US 8,125,401 B2
(45) Date of Patent: Feb. 28, 2012

(54) ANTENNA DEVICE

(75) Inventors: Hiromitsu Ito, Hakusan (JP); Hiroyuki Kubo, Kanazawa (JP); Kuniaki Yosui, Kanazawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 382 days.

(21) Appl. No.: 12/341,041

(22) Filed: Dec. 22, 2008

(65) Prior Publication Data

US 2009/0096694 A1 Apr. 16, 2009

Related U.S. Application Data

(63) Continuation of application No. PCT/JP2006/326073, filed on Dec. 27, 2006.

(30) Foreign Application Priority Data

Jul. 7, 2006 (JP) ................................. 2006-187486
Sep. 1, 2006 (JP) ................................. 2006-237272

(51) Int. Cl.
*H01Q 7/08* (2006.01)
(52) U.S. Cl. ......................... 343/788; 343/787; 343/795
(58) Field of Classification Search .................. 343/787, 343/788, 895, 866, 867
See application file for complete search history.

(56) References Cited

U.S. PATENT DOCUMENTS

| 6,384,799 B1 * | 5/2002 | Otomo et al. ................. 343/895 |
| 6,927,738 B2 | 8/2005 | Senba et al. |
| 2005/0162331 A1 | 7/2005 | Endo et al. |
| 2005/0270249 A1 | 12/2005 | Saegusa et al. |
| 2006/0022886 A1 * | 2/2006 | Hein et al. ..................... 343/787 |
| 2006/0214866 A1 | 9/2006 | Araki et al. |

FOREIGN PATENT DOCUMENTS

| CN | 1757136 A | 4/2006 |
| EP | 0 590 589 A1 | 4/1994 |
| EP | 1 689 029 A1 | 8/2006 |
| EP | 2 009 518 A1 | 12/2008 |
| JP | 01-013710 A | 1/1989 |
| JP | 11-122146 A | 4/1999 |
| JP | 2001-34726 A | 2/2001 |
| JP | 2002-207981 A | 7/2002 |
| JP | 2003-318634 A | 11/2003 |
| JP | 2004-38702 A | 2/2004 |
| JP | 2004-134957 A | 4/2004 |
| JP | 2004-153463 A | 5/2004 |
| JP | 2005-210223 A | 8/2005 |

(Continued)

OTHER PUBLICATIONS

Official communication issued in the counterpart Japanese Application 2006-237272, mailed on Feb. 27, 2007.

(Continued)

*Primary Examiner* — Dieu H Duong
(74) *Attorney, Agent, or Firm* — Keating & Bennett, LLP (57) ABSTRACT

An antenna device having a magnetic core to be surface-mounted on a circuit substrate includes a pair of coil portions spaced apart from each other at a predetermined interval. The coil portions are connected by a connecting conductor. An end of the magnetic core includes a curved or bent portion curved toward the circuit substrate. This structure defines an RFID antenna device having an improved receiving sensitivity that can be surface-mounted without increasing the thickness of a casing of a mobile electronic device.

8 Claims, 5 Drawing Sheets

FOREIGN PATENT DOCUMENTS

| | | |
|---|---|---|
| JP | 2005-277524 A | 10/2005 |
| JP | 2005-333244 A | 12/2005 |
| JP | 2006-50522 A | 2/2006 |
| WO | 2005/053096 A1 | 6/2005 |

OTHER PUBLICATIONS

Official Communication issued in International Patent Application No. PCT/JP2006/326073, mailed on Mar. 6, 2007.

Official Communication issued in corresponding European Patent Application No. 06843455.4, mailed on Apr. 1, 2010.

Ito et al., "Antenna Device", U.S. Appl. No. 13/043,654, filed Mar. 9, 2011.

Official Communication issued in corresponding European Patent Application No. 06 843 455.4, mailed on Jun. 30, 2011.

Official Communication issued in corresponding Chinese Patent Application No. 200680055253.2, mailed on Mar. 24, 2011.

* cited by examiner

ANTENNA DEVICE

BACKGROUND OF THE INVENTION

The present invention relates to antenna devices that can be utilized as an antenna in mobile electronic devices, for example.

DESCRIPTION OF THE RELATED ART

As disclosed in, for example, Japanese Unexamined Patent Application Publication No. 2004-153463 and Japanese Unexamined Patent Application Publication No. 2006-050522, antenna coils are mounted in casings of mobile electronic devices, such as mobile phones, that are equipped with RFID (Radio Frequency Identification) radio tags communicating with external devices via electromagnetic signals.

According to Japanese Unexamined Patent Application Publication No. 2004-153463, data carrier signals from the outside are received by an antenna coil mounted on a substrate included in a mobile phone so as to transmit and receive data in a non-contact manner to and from a reader/writer. The antenna coil of Japanese Unexamined Patent Application Publication No. 2004-153463 is a substantially planar coil adhered to a planar magnetic core. The antenna coil is mounted so that the axial direction of the antenna coil is substantially perpendicular to the mounting substrate, that is, the axial direction is substantially perpendicular to a plane of the casing of the mobile phone terminal.

An antenna coil according to Japanese Unexamined Patent Application Publication No. 2006-050522 is used as an antenna for radio-controlled clocks and RFID systems, and is disposed inside a casing. A coil of this antenna coil is wound around a magnetic core made of a magnetic body. Ends of the magnetic core of the antenna coil are bent in a direction away from the adjacent casing or a metal portion of the adjacent casing. Such a configuration enables many magnetic fluxes entering the casing to converge, which enables the antenna to be highly sensitive.

Systems for checking tickets by prompting users to place RFID-equipped mobile phones having the aforementioned antenna coils, instead of commuter passes, over automated ticket gates and exchanging user information have been proposed. Generally, users place a principal surface of mobile phone terminals in a substantially horizontal orientation over a detecting surface of a reader/writer. In this case, the majority of the magnetic fluxes that radiate from the reader/writer enter the mobile phone in a direction substantially vertical to the principal surface of the mobile phone. A liquid crystal display panel, a keyboard, an RF circuit substrate, and a battery are included in a casing of mobile phone. Since these components have a substantially planar ground electrode, the magnetic fluxes that are substantially perpendicular to the principal surface of the mobile phone terminals cannot penetrate the mobile phone terminals.

An antenna coil described in Japanese Unexamined Patent Application Publication No. 2004-153463 is mounted so that the coil axis is substantially perpendicular to a principal surface of a circuit substrate. Accordingly, when the aforementioned communication configuration is used, the magnetic fluxes entering the casing of the mobile phone terminals are transmitted through the coil axis of the antenna coil, which can induce the current in the antenna coil. However, since a lateral area of the magnetic core is relatively small in Japanese Unexamined Patent Application Publication No. 2004-153463, the radiation efficiency of the magnetic fluxes transmitted through the antenna coil is relatively low. Accordingly, it is difficult for the magnetic fluxes to enter the mobile phone and the current caused in the antenna coil is significantly weak. Accordingly, there is a problem in that the optimum antenna sensitivity cannot be achieved.

On the other hand, an antenna coil described in Japanese Unexamined Patent Application Publication No. 2006-050522 is configured so that the coil axis is substantially parallel to a principal surface of a circuit substrate. Since a coil is wound around a central portion of a magnetic core in the antenna coil described in Japanese Unexamined Patent Application Publication No. 2006-050522, magnetic fluxes can enter the bent ends not having the winding coil. When users place mobile phone over a reader/writer of automated ticket gates, the users generally intends to place a central portion of the mobile phone terminals over the reader/writer. However, since the antenna coil described in Japanese Unexamined Patent Application Publication No. 2006-050522 is configured to receive the magnetic fluxes at the ends thereof, the current induced in the antenna coil by the incoming magnetic fluxes is relatively weak when the central portion is placed over the reader/writer. That is, the possibility of successful communication with automated ticket gates that function as readers/writers becomes very low. When the communication with the automated ticket gates is not performed successfully, the automated ticket gates block users of the mobile phone from entering. Since the number of people passing through the automated ticket gates per unit of time during rush hours in metropolitan areas is extremely high, major disruptions may occur when the automated ticket gate systems frequently block the human flow due to a communication failure.

To improve communication performance of such antenna coils, the antenna coil described in Japanese Unexamined Patent Application Publication No. 2006-050522 may be mounted so that the coil axis is substantially perpendicular to the principal surface of the mobile phone. However, such amounting method causes a problem of an increase in the thickness of the casing. Even if the antenna coil can be disposed in this manner, the aforementioned ground electrode is provided at the central portion of the mobile phone. Thus, to avoid the influence thereof, the antenna coil must be disposed at a corner portion of the mobile phone. As mentioned above, when users place mobile phone terminals over a reader/writer of automated thicket gates, the users intend to place the central portion of the mobile phone terminals over the reader/writer. The possibility that the coil axis of the antenna coil of the mobile phone terminals is shifted from an area of the reader/writer that enables the most efficient communication is increased, and there is a problem in that it is difficult to maintain an optimum communication state.

SUMMARY OF THE INVENTION

To overcome the problems described above, preferred embodiments of the present invention provide antenna devices that can be surface-mounted on a circuit substrate of a mobile phone or mounted inside a casing, that can decrease the thickness, and that can achieve favorable communication with a reader/writer.

A preferred embodiment of the present invention includes an antenna coil including a magnetic core that has a first principal surface and a second principal surface facing the first principal surface and that has a curved or bent (simply referred to as "curved" herein) portion at least one end of the magnetic core, and a coil disposed on the first principal surface of the magnetic core, a coil axis being substantially perpendicular to the first principal surface, and an opening disposed at a central portion of the coil, and a circuit substrate. The antenna coil is mounted on the circuit substrate such that the second principal surface of the magnetic core faces a mounting surface of the circuit substrate.

Another preferred embodiments of the present invention includes an antenna coil including a magnetic core having a curved portion at least one end of the magnetic core, and a coil that is wound around the magnetic core and that is defined by a coil portion A and a coil portion B connected with each other at a predetermined interval, and a circuit substrate. The curved portion is provided at an end of the magnetic core located in a direction of the coil axis of the coil. The antenna coil is mounted on the circuit substrate such that the coil axis is parallel or substantially parallel to a principal surface of the circuit substrate.

Preferably, the curved portion is disposed in a direction along a lateral surface of the circuit substrate.

Preferably, at least a portion of an end surface of the curved portion is located outside the circuit substrate in plan view.

The antenna coil is preferably mounted on the circuit substrate with an interval therebetween.

Preferably, a flexible substrate having an electrode pattern provided thereon is wound around the magnetic core to define the coil.

Preferably, the antenna coil includes an electrode film, which is insulated from the coil, on a surface of the magnetic core that faces the circuit substrate.

The coil portion A and the coil portion B are preferably wound around different magnetic cores, and coil axes of the coil portion A and the coil portion B are preferably substantially coincident.

According to a preferred embodiment of the present invention, the coil portion A and the coil portion B are preferably wound around different magnetic cores, and coil axes of the coil portion A and the coil portion B are shifted such that at least a portion of a coil section of the coil portion A and a coil section of the coil portion B that are projected onto a given plane overlap one another.

Preferably, the coil portion A and the coil portion B are connected by an electrode pattern provided on the circuit substrate.

Alternatively, the coil portion A and the coil portion B may preferably be connected by an electrode pattern provided on a substrate different from the circuit substrate.

The coil portion A and the coil portion B are preferably connected so that an electromotive force is not caused by common magnetic fluxes that penetrate in a direction of the coil axis.

Coil winding directions of the coil portion A and the coil portion B around the coil axis are preferably different from one another.

According to various preferred embodiments of the present invention, antenna devices that can be surface-mounted on a circuit substrate of a mobile phone terminal or mounted inside a casing, and that have a decreased thickness can be obtained. In addition, since the magnetic reluctance at an end of an antenna coil is reduced, magnetic fluxes entering the antenna coil can pass through a magnetic core more easily. This improves the sensitivity of the antenna, and antenna devices that achieve favorable communication with a reader/writer can be obtained.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described below with reference to the drawings.

Figure 1:
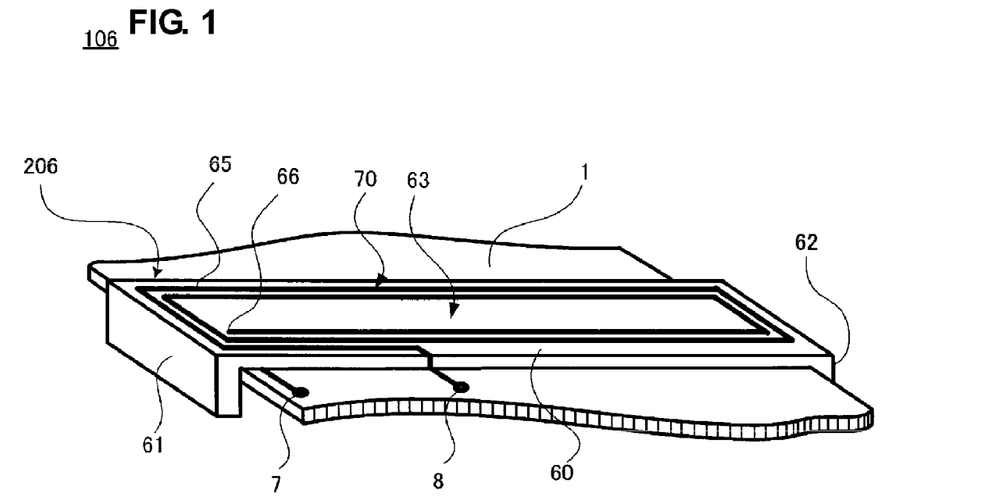
FIG. 1 is a perspective view of an antenna device describing a first preferred embodiment of the present invention.

A first preferred embodiment will be described with reference to FIG. 1. FIG. 1 is a perspective view of an antenna device 106 that is a first preferred embodiment of the present invention.

An antenna coil 206 is provided on a principal surface of a circuit substrate 1. The antenna coil 206 can preferably be readily adhered to the circuit substrate 1 using an adhesive or a double-sided adhesive tape, for example. The circuit substrate 1 preferably is a substrate provided in a mobile phone. An RF circuit and a control circuit, not shown, are provided on the circuit substrate 1. The circuit substrate 1 is arranged in a casing to be substantially parallel to a principal surface of the mobile phone terminal. In addition, a ground electrode (not shown) is provided on substantially the entire surface of the circuit substrate 1 that faces a surface on which the antenna coil 206 is disposed.

The antenna coil 206 is defined by a magnetic core 60 and a coil 70. The magnetic core 60 has a first principal surface and a second principal surface. The first principal surface faces the second principle surface, while the second principal surface faces the circuit substrate. In addition, curved portions 61 and 62 that are arranged along lateral surfaces of the circuit substrate 1 are provided at both ends of the magnetic core 60. That is, the magnetic core 60 curves or bends near the lateral surfaces of the circuit substrate 1. Since the magnetic core 60 curves so as to sandwich the circuit substrate 1, end surfaces of the magnetic core 60 are not disposed on the circuit substrate 1. The end surfaces of the magnetic core mean surfaces facing a curving direction of the magnetic core and are located at leading ends of the magnetic core. In this preferred embodiment, the end surfaces indicate surfaces of the curved portions 61 and 62 that are arranged substantially in parallel to the circuit substrate 1. The coil 70 includes a coil conductor 65 disposed on the first principal surface of the magnetic core 60 that does not face the circuit substrate 1. The coil 70 has a shape of a spiral on the surface, and the coil axis thereof is perpendicular or substantially perpendicular to the first principal surface of the magnetic core 60. An opening 63 not including the coil conductor 65 is disposed at the approximate center of the coil 70. By providing the opening 63, the coil conductor 65 does not prevent magnetic fluxes from passing into the antenna coil 206, and the magnetic fluxes from the direction perpendicular or substantially perpendicular to the first principal surface of the magnetic core 60 are allowed to pass through. A through hole is disposed at a conductor end 66 of the coil 70. The conductor end 66 of the coil 70 is electrically connected to an electrode (not shown) disposed on a surface of the circuit substrate 1 that faces the antenna coil 206 by soldering, for example, and is ultimately connected to a terminal 7. A conductor end on a side opposite to the side of the conductor end 66 of the coil 70 is connected to a terminal 8. The terminals 7 and 8 are preferably pattern electrodes that are provided on the circuit substrate 1, and are connected to an RFID processing circuit, not shown, on the circuit substrate 1.

Magnetic fluxes from above the antenna device 106 pass into the coil opening 63, and induce the current in the coil 70. By making the coil opening 63 larger, the incoming magnetic fluxes increase and the induced current is increased, which is thus preferable. The magnetic fluxes that are passed into the magnetic core 60 cannot penetrate the circuit substrate 1 since a ground electrode is provided on the circuit substrate 1. The magnetic fluxes branch off in the magnetic core 60, and pass outside primarily from the curved portions 61 and 62. Since the magnetic core 60 includes the curved portions 61 and 62 at both ends thereof, a section perpendicular or substantially perpendicular to each principal surface is larger at the ends of the magnetic core 60. Accordingly, the magnetic reluctance at the ends of the magnetic core 60 is decreased and the magnetic fluxes can pass through the magnetic core 60 more easily. In addition, since the end surfaces of the curved portions 61 and 62 are not disposed on the circuit substrate 1 and are located outside of the circuit substrate 1, the magnetic fluxes are radiated from substantially the entire surface of the curved portions including the end surfaces. Accordingly, the structure provides significantly high radiation efficiency of the magnetic fluxes and enables the magnetic fluxes to pass through the magnetic core 60 more easily. Since the coil 70 preferably has a substantially spiral shape on the first principal surface of the magnetic core 60 in this preferred embodiment, it is possible to make the magnetic core 60 thinner as compared to the following preferred embodiments.

Figure 2:
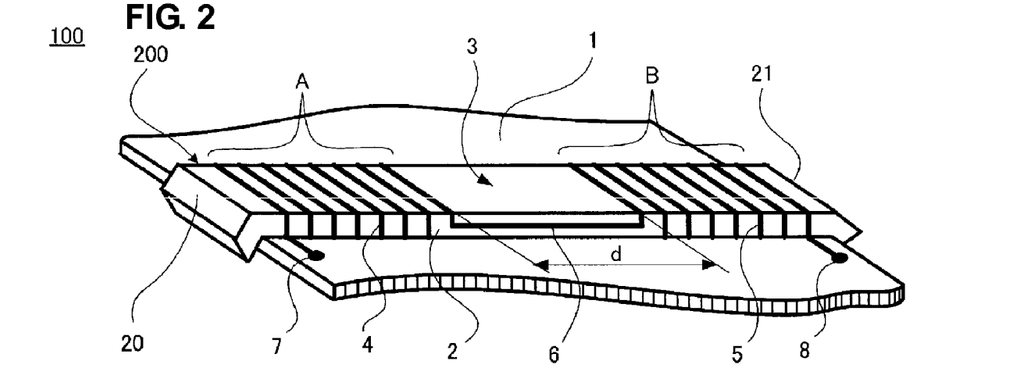
FIG. 2 is a perspective view of an antenna device describing a second preferred embodiment of the present invention.

A second preferred embodiment will be described with reference to FIG. 2. FIG. 2 is a perspective view of an antenna device 100 that is a second preferred embodiment of the present invention. The same numerals are applied to the same portions as those of FIG. 1, and the description thereof is omitted.

An antenna coil 200 is disposed on a circuit substrate 1. A magnetic core 2 is provided in the antenna coil 200. Both ends of the magnetic core 2 curve near lateral surfaces of the circuit substrate 1 so as to define curved portions 20 and 21 that extend in a direction along the lateral surfaces of the circuit substrate 1. A coil conductor 4 and a coil conductor 5 are wounded around the magnetic core 2, thereby defining a coil portion A and a coil portion B at a portion of the magnetic core 2 excluding the curved portions 20 and 21. The coil portion A and the coil portion B define a pair of coils. The curved portions 20 and 21 are arranged in a direction of coil axes of the coil portion A and the coil portion B. In addition, the coil axes of the coil portion A and the coil portion B are substantially parallel to a mounting surface of the circuit substrate 1, and are preferably substantially coincident with one another. Although only eight turns of the winding are shown in each coil portion for convenience of description, the number of turns is not limited to this. The coil portion A and the coil portion B are spaced apart from one another by a predetermined interval d, and a non-coil portion 3 is provided therebetween. The non-coil portion 3 allows magnetic fluxes to pass into the magnetic core 2. The right end of the coil portion A and the left end of the coil portion B are serially connected by a connecting conductor 6 to define a pair of coils. The coil conductors 4 and 5 and the connecting conductor 6 defining the pair of coils are preferably formed by a single copper wire. The copper wire is wound around the magnetic core 2, whereby the coil portion A and the coil portion B are formed. Since winding directions around the coil axes of the coil portion A and the coil option B are opposite to one another, the coil does not induce a current in response to magnetic fluxes that penetrate the magnetic core along both coil axes. A terminal 7 is connected to a starting end (or a terminating end) of the coil portion A, and a terminal 8 is connected to a terminating end (or a starting end) of the coil portion B. The terminals 7 and 8 and the ends of the coils can preferably be electrically connected by soldering, for example. The terminals 7 and 8 are pattern electrodes provided on the circuit substrate 1, and are connected to an RFID processing circuit, not shown, on the circuit substrate 1.

Figure 3:
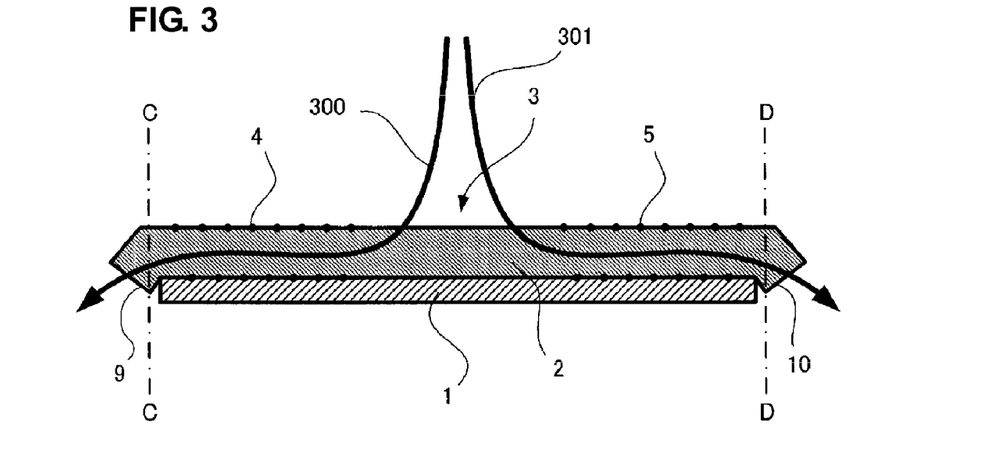
FIG. 3 is a conceptual sectional view describing a principle of an operation of a preferred embodiment of the present invention.

FIG. 3 is a conceptual sectional view along the coil axis of the antenna device 100 shown in FIG. 2. In FIG. 3, the same numerals are applied to the same portions as those of FIG. 2, and the description thereof is omitted.

Magnetic fluxes 300 and 301 from above the antenna device 100, i.e., from a principal surface of a mobile phone cannot penetrate the circuit substrate 1 because a ground electrode is disposed on the circuit substrate 1. The magnetic fluxes 300 and 301 enter the magnetic core 2 through the non-coil portion 3 disposed between the coil portion A and the coil portion B of the antenna coil 200, and pass through the magnetic core 2 along the coil axis, and go out from end faces 9 and 10. In this preferred embodiment, the end surfaces 9 and 10 mean surfaces extending a curving direction of the magnetic core 2 and are located at leading ends of the magnetic core 2. Since outer sides of the coil portion A and the coil portion B of the magnetic core 2 are bent toward the side of the circuit substrate 1, a CC-cross section and a DD-cross section become larger, due to which, the magnetic reluctance at the exits of the magnetic fluxes reduces and the magnetic fluxes can pass through the magnetic core 2 more easily. Similar advantages can be obtained when the magnetic core is bent toward a side opposite to the circuit substrate 1. When the magnetic core is bent toward the side of the circuit substrate 1, components of the magnetic fluxes 300 and 301 that are bent toward the side of the circuit substrate 1 are produced, as shown in FIG. 3. Paths of the magnetic fluxes bent toward the side of the circuit substrate 1 is along an original path of the magnetic fluxes and the magnetic fluxes can pass through the magnetic core 2 more easily, which is more preferable. Although the curved portions 20 and 21 are preferably provided at both ends of the magnetic core 2 of the antenna device 100, the curved portions are not necessarily disposed at both ends. In addition, one end of the magnetic core 2 may be bent toward the side of the circuit substrate 1, while the other end may be bent away from the side of the circuit substrate 1. However, providing curved portions that curve toward the side of the circuit substrate 1 at both sides is more effective, and thus, more preferable.

Since winding directions of the coil portion A and the coil portion B are opposite to one another, a direction of the current induced by the magnetic flux 300 at the coil portion A and flowing around the coil axis is substantially the same as a direction of the current induced by the magnetic flux 301 at the coil portion B and flowing around the coil axis. Since the coil portion A and the coil portion B are connected by the connecting conductor 6 so that the right end of the coil portion A and the left end of the coil portion B is connected as shown in FIG. 2, the current induced in the coil portion A and the current induced in the coil portion B are not cancelled out. This enables a high-level signal to be extracted from the terminal 7 and the terminal 8.

Although a ground electrode is preferably provided on a surface facing a surface of the circuit substrate 1 on which the magnetic core 2 is mounted in this preferred embodiment, for example, a configuration in which a ground electrode is provided on a middle layer of a multilayer circuit substrate provides advantages that are similar to those of the above-described preferred embodiments. In addition, the coil conductor 4 defining the coil portion A, the coil conductor 5 defining the coil portion B, and the connecting conductor 6 may be defined by different copper wires, and may be electrically connected to each other by soldering, for example. Furthermore, although the coil portion A and the coil portion B are serially connected in this preferred embodiment, the coil portion A and the coil portion B may be connected in parallel.

Figure 4:
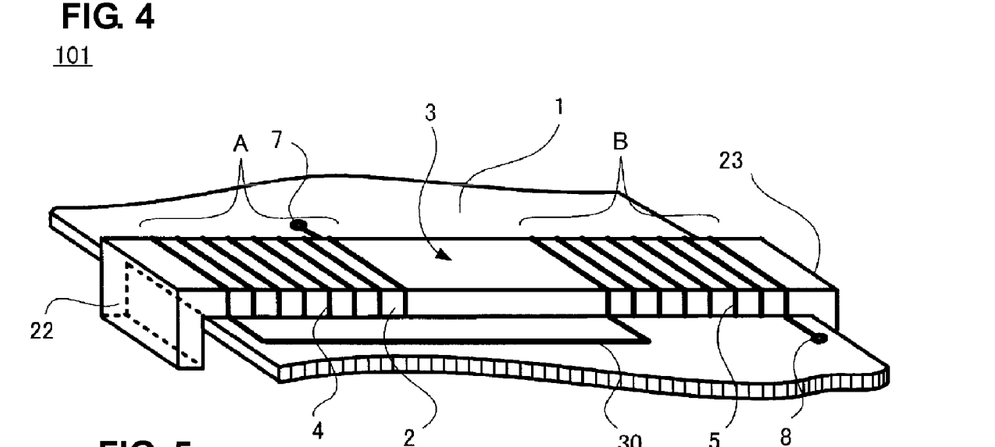
FIG. 4 is a perspective view of an antenna device describing a third preferred embodiment of the present invention.

A third preferred embodiment will be described next using FIG. 4. FIG. 4 is a perspective view of an antenna device 101 that is a third preferred embodiment of the present invention. The same numerals are applied to the same portions as those of FIG. 2, and the description thereof is omitted.

A coil portion A and a coil portion B are connected by a conductor pattern 30 provided on a circuit substrate 1. The conductor pattern 30 can preferably be formed on the circuit substrate 1 by pattern printing, for example. An end of the coil portion A and an end of the conductor pattern 30, and an end of the coil portion B and the other end of the conductor pattern 30 are preferably soldered, for example. Here, an example in which a winding direction of the coil portion A around the coil axis and a winding direction of the coil portion B around the coil axis are the same direction is shown. The left end of the coil portion A and the left end of the coil portion B is connected by the conductor pattern 30 as shown in FIG. 4 so that the current induced in the coil portion A and the current induced in the coil portion B by magnetic fluxes as shown in FIG. 3 are not cancelled. In the third preferred embodiment, as in the second preferred embodiment, the coil portion A and the coil portion B may be connected using a connecting conductor provided on a magnetic core 2. However, when such a configuration is used, since the current may flow into locations other than the ends of the coil portions A and B due to crossing of the connecting conductor provided on the magnetic core 2 and the coil portions A and/or B, insulating layers must be provided at the crossing portions.

The magnetic core 2 includes curved portions 22 and 23 whose shapes are different from those of the antenna device 100. The curved portions 22 and 23 are provided along lateral surfaces of a circuit substrate 1. When the configuration of the antenna device 101 is used, a CC-cross section and a DD-cross section corresponding to FIG. 3 are further enlarged, which further reduces the magnetic reluctance at the ends of the magnetic core 2, enabling magnetic fluxes to pass through more easily and increasing the sensitivity of the antenna. In addition, an effect of bending magnetic fluxes toward the side of the circuit substrate is also increased, which is preferable.

Figure 5:
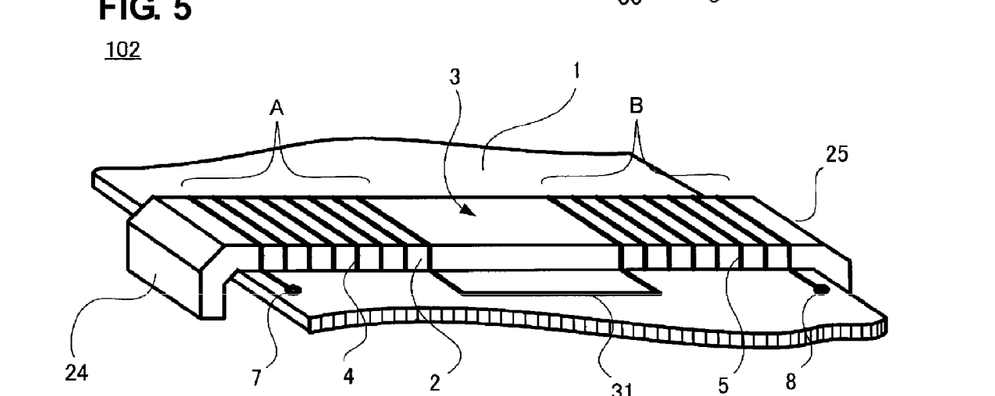
FIG. 5 is a perspective view of an antenna device describing a fourth preferred embodiment of the present invention.

A fourth preferred embodiment will be described next using FIG. 5. FIG. 5 is a perspective view of an antenna device 102 that is a fourth preferred embodiment of the present invention. The same numerals are applied to the same portions as those of FIG. 2, and the description thereof is omitted.

The right end of a coil portion A and the left end of a coil portion B are connected by a conductor pattern 31 provided on a circuit substrate 1. Here, as in the second preferred embodiment, a winding direction of the coil portion A around the coil axis and a winding direction of the coil portion B around the coil axis are opposite to one another. The antenna device 102 of the fourth preferred embodiment is different from the second preferred embodiment in that the coil portion A and the coil portion B are connected using a conductor pattern 31 provided on the circuit substrate 1 but not using a conductor provided on a magnetic core 2 and in that the magnetic core 2 preferably includes two-step curved portions 24 and 25 at both ends thereof. The curved portion may have three or more steps, for example. This can prevent a crack that may occur during forming and burning of the magnetic core. Advantages regarding electric characteristics are substantially the same as those of the second preferred embodiment.

Figure 6:
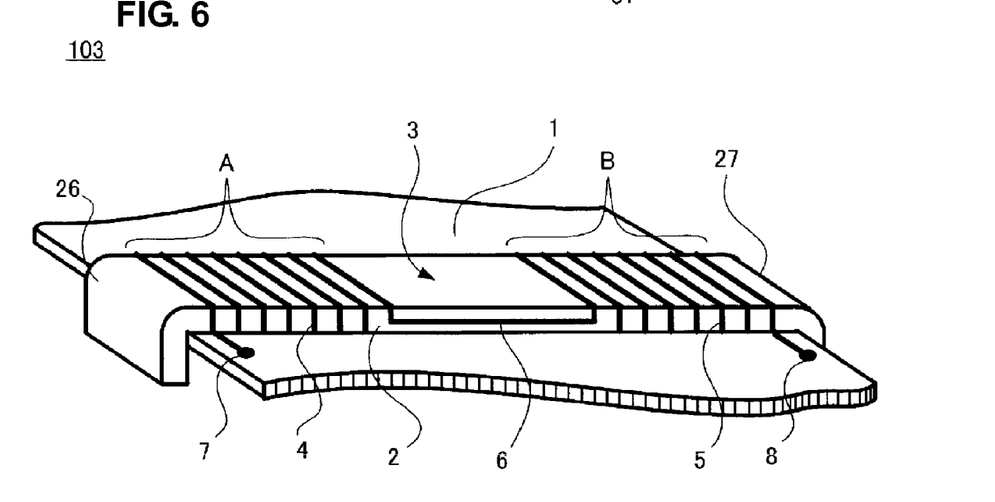
FIG. 6 is a perspective view of an antenna device describing a fifth preferred embodiment of the present invention.

A fifth preferred embodiment will be described next using FIG. 6. FIG. 6 is a perspective view of an antenna device 103 that is a fifth preferred embodiment of the present invention. The same numerals are applied to the same portions as those of FIG. 2, and the description thereof is omitted.

A configuration of a coil portion A, a coil portion B, and a connecting conductor 6 are substantially the same as that of the second preferred embodiment. Both ends of a magnetic core 2 curve without a sharp corner to define curved portions 26 and 27. The magnetic core having such a shape can be produced by first pressing or molding a magnetic core into a plate shape in the course of forming of the magnetic core 2, and burning the magnetic core after performing the bending in an unsintered state. Since a die cost is cheaper than pressing complex shapes, such as those in the third preferred embodiment and the fourth preferred embodiment, the magnetic core can be inexpensively produced. Advantages regarding electric characteristics are substantially the same as those of the second preferred embodiment.

Figure 7:
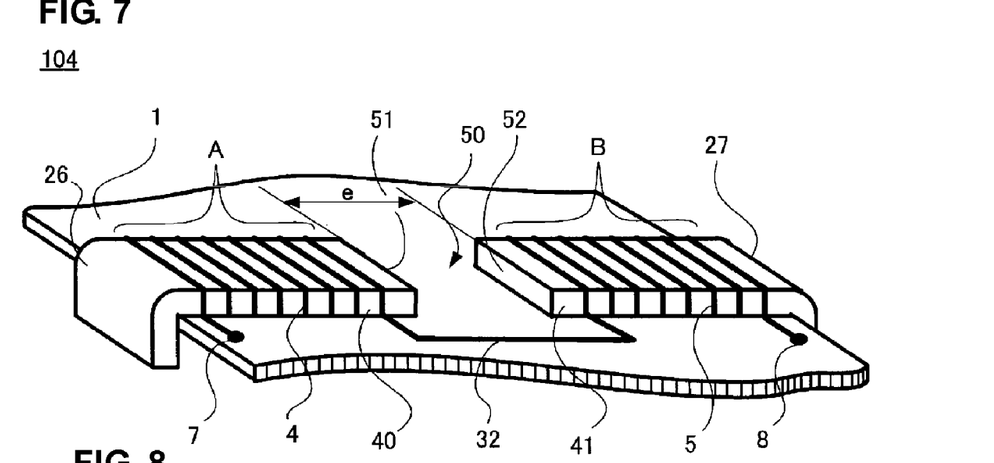
FIG. 7 is a perspective view of an antenna device describing a sixth preferred embodiment of the present invention.

A sixth preferred embodiment will be described next using FIG. 7. FIG. 7 is a perspective view of an antenna device 104 that is a sixth preferred embodiment of the present invention. The same numerals are applied to the same portions as those of FIG. 6, and the description thereof is omitted.

The antenna device 104 includes two divided magnetic cores 40 and 41. A coil portion A is provided on the magnetic core 40 using a coil conductor 4, and a coil portion B is provided on the magnetic core 41 using a coil conductor 5. The coil portions define a pair of coils. The magnetic cores 40 and 41 are mounted on a circuit substrate so as to be spaced apart from each other by a predetermined interval e so that coil axes of the coil portion A and the coil portion B are substantially coincident with one another. The right end of the coil portion A and the left end of the coil portion B are connected by a conductor pattern 32 provided on the circuit substrate. The configuration other than the division of the magnetic cores and the connection of the coil portion A and the coil portion B by the conductor pattern 32 disposed on the circuit substrate is substantially the same as that of the fifth preferred embodiment. Such a configuration enables the magnetic core 40 having the coil portion A provided thereon and the magnetic core 41 having the coil portion B provided thereon to include substantially the same components. Since the configuration of each coil is simple, this configuration has an advantage in mass production and the antenna device can be inexpensively produced.

Since magnetic fluxes extending to a circuit substrate 1 perpendicularly or substantially perpendicularly from above the circuit substrate 1 cannot penetrate a ground electrode disposed on the circuit substrate 1, the magnetic fluxes are bent in a direction along a surface of the circuit substrate 1 at a non-coil portion 50. The bent magnetic fluxes pass into the magnetic cores from ends 51 and 52 of the magnetic cores on the circuit substrate 1, and induce the current in the coil portion A and the coil portion B. A conceptual diagram of magnetic fluxes passing through the antenna device 104 is substantially the same as that shown in FIG. 3.

Figure 8:
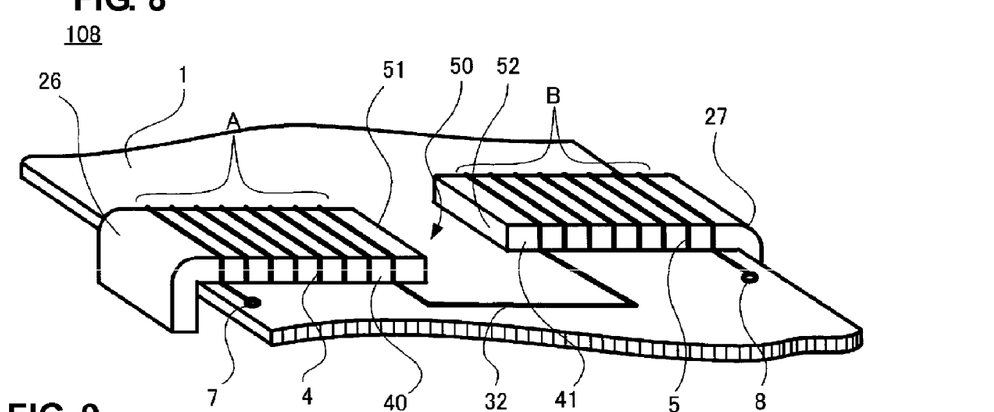
FIG. 8 is a perspective view of an antenna device describing a seventh preferred embodiment of the present invention.

A seventh preferred embodiment will be described next using FIG. 8. FIG. 8 is a perspective view of an antenna device 108 that is a seventh preferred embodiment of the present invention. The same numerals are applied to the same portions as those of FIG. 7, and the description thereof is omitted.

A method for forming magnetic cores 40 and 41 and coil portions A and B is substantially the same as that of the sixth preferred embodiment. A point different from the sixth preferred embodiment is that coil axes of the coil portion A and the coil portions B differ, i.e. are not substantially coincident with one another. The magnetic core 40 and the magnetic core 41 are arranged on a circuit substrate 1 so that a coil cross section of the coil A and a coil cross section of the coil B projected onto a given plane perpendicular or substantially perpendicular to the coil axes include an overlapping portion and a non-overlapping portion. By shifting the locations of the magnetic core 40 and the magnetic core 41, the coil axes of the coil portion A and the coil portion B are also shifted. Such an arrangement method enables fine adjustment of the mounting locations of the separate magnetic cores 40 and 41, thus increasing the design flexibility of circuit substrates.

In addition, the antenna device 108 according to this preferred embodiment does not have any significant deterioration of communication distance as compared to the antenna device according to the sixth preferred embodiment. This is because the number magnetic fluxes, among magnetic fluxes passing between the magnetic core 40 and the magnetic core 41, that are not led into the coil portion A and the coil portion B is extremely low since the magnetic cores are mounted on the circuit substrate 1 so that the coil cross section of the coil portion A and the coil cross section of the coil portion B projected onto the given plane perpendicular or substantially perpendicular to the coil axes have an overlapping portion and a non-overlapping portion when viewed from the coil axis direction.

Although the arrangement locations of the magnetic cores 40 and 41 are preferably shifted in a direction perpendicular or substantially perpendicular to the coil axis along the circuit substrate 1 in the above-described preferred embodiment, the present invention is not limited to this preferred embodiment. For example, the location of each magnetic core may be shifted in a direction perpendicular or substantially perpendicular to a principal surface of a circuit substrate so that distances between each magnetic core and the circuit substrate differ or the location of each magnetic core may be shifted in different direction so as to shift the coil axes.

Figure 9:
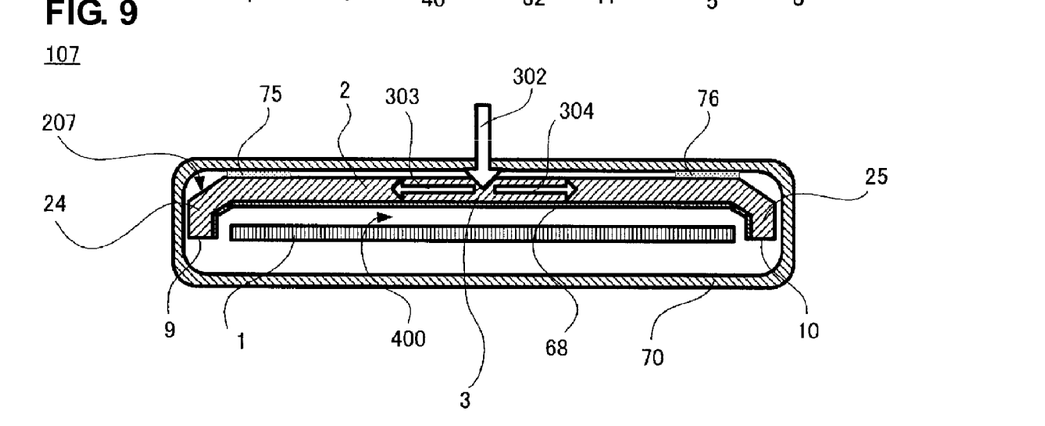
FIG. 9 is a sectional view of an antenna device describing an eighth preferred embodiment of the present invention.

An eighth preferred embodiment will be described with reference to FIG. 9. FIG. 9 is a sectional view along a coil axis of an antenna device 107 that is an eighth preferred embodiment of the present invention. This preferred embodiment shows a sectional view when a magnetic core 2 is not adhered to a circuit substrate 1 in the antenna device 102 that is the fourth preferred embodiment shown in FIG. 5. The same numerals are applied to the same portions as those of FIG. 5, and the description thereof is omitted. Although the coil portion A and the coil portion B are connected with the conductor pattern 31 disposed on the circuit substrate 1 in the fourth preferred embodiment, a coil portion A and a coil portion B are preferably connected by a connecting conductor disposed on a lateral surface of a magnetic core 2 in this preferred embodiment as in the fifth preferred embodiment shown in FIG. 6. Additionally, the sections of coil conductors 4 and 5 are omitted from FIG. 9.

In this preferred embodiment, a description is provided of a sectional diagram of a casing 70 of a mobile phone. The casing 70 is preferably made of a resin or other suitable material that allows magnetic fluxes to pass. A magnetic core 2 is fixed to the casing 70 with fixing members 75 and 76. An adhesive or a double-sided adhesive tape is preferable as the fixing member, for example. In addition, the magnetic core may be mechanically fixed to a suitable holder disposed on the casing 70. Preferably, a member that does not directly transmit an impact imposed on the casing 70 to the magnetic core 2 and that has the elasticity for absorbing the linear expansion of the casing 70 and the magnetic core 2 is used as the fixing member. When the magnetic core 2 is fixed to the casing 70 as described above, a gap 400 is provided between the circuit substrate 1 and the magnetic core 2. Although electronic components to be mounted on the circuit substrate 1, such as, for example, an IC, a capacitor, an inductor, and a filter, for example, are provided in the gap 400, the illustration thereof is omitted.

It is assumed that a reader/writer is arranged at the upper side of this drawing. Magnetic fluxes 302 extending from the upper side of the drawing penetrate the casing 70, and pass into the magnetic core 2 from a non-coil portion 3 of the magnetic core 2. As described in FIG. 3, when the magnetic core 2 is arranged close to the circuit substrate 1, magnetic fluxes are shielded by a ground surface disposed on the circuit substrate 1 and are guided to the magnetic core 2, whereby the current is induced. When a gap 200 is provided, as in this preferred embodiment, and the magnetic core 2 does not have an electrode for shielding magnetic fluxes, a portion of the magnetic fluxes 302 passing into the magnetic core 2 passes through the magnetic core 2, reaches the ground surface of the circuit substrate 1, is shielded by the ground surface, and is guided to the gap 400. In this preferred embodiment, a shielding electrode 68 is preferably disposed on substantially an entire surface of the magnetic core 2 facing the circuit substrate 1. The shielding electrode 68 may preferably be formed according to a method for affixing a plate of a conductive member to the magnetic core 2 or a method for coating a conductive paste onto the magnetic core 2, for example. The magnetic fluxes 302 cannot penetrate the magnetic core 2 due to the shielding electrode 68, and are divided into a magnetic flux 303 passing to the left side of the magnetic core 2 and a magnetic flux 304 passing to the right side of the magnetic core 2. As described in FIG. 3, the magnetic flux 303 and the magnetic flux 304 induce the currents in the coil portion A and the coil portion B. Since the shielding electrode 68 must be electrically insulated from the coil conductors 4 and 5, the shielding electrode 68 is preferably disposed on the magnetic core 2 through an insulating layer defined by an insulating adhesive, for example. It is preferable that the shielding electrode 68 is disposed on the magnetic core 2 through an insulating layer of low magnetic permeability even at the non-coil portion 3 not including the coil conductor 4 or 5 so as not to reduce the Q value of the coil portions A and B functioning as an antenna. The shielding electrode 68 does not need to cover substantially the entire surface of the magnetic core 2 that faces the circuit substrate 1. In addition, the shielding electrode 68 may preferably be extended to a lateral surface of the magnetic core 2 if required.

Although an example that end surfaces 9 and 10 not defining the curve of the magnetic core 2 are arranged to be outside of a mounting surface of the circuit substrate 1 is shown in this preferred embodiment, the end surfaces 9 and 10 may be arranged over the mounting surface of the circuit substrate 1. However, when the end surfaces 9 and 10 are not arranged over the mounting surface of the circuit substrate 1 and are located outside of the circuit substrate 1 in plan view, the magnetic fluxes 303 and 304 having induced the current in the coil portion A and the coil portion B are radiated to the outside from the surface of the curved portions 24 and 25 including the end surfaces 9 and 10. Accordingly, since an area from which the magnetic fluxes are radiated is increased and the radiation efficiency of the magnetic fluxes is improved, it is more preferable to arrange the end surfaces 9 and 10 outside of the mounting surface.

Figure 10:
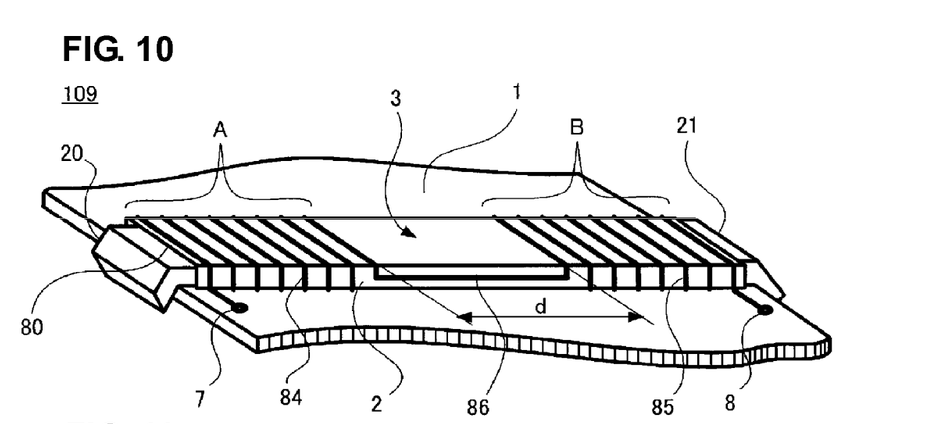
FIG. 10 is a perspective view of an antenna device describing a ninth preferred embodiment of the present invention.
Figure 11:
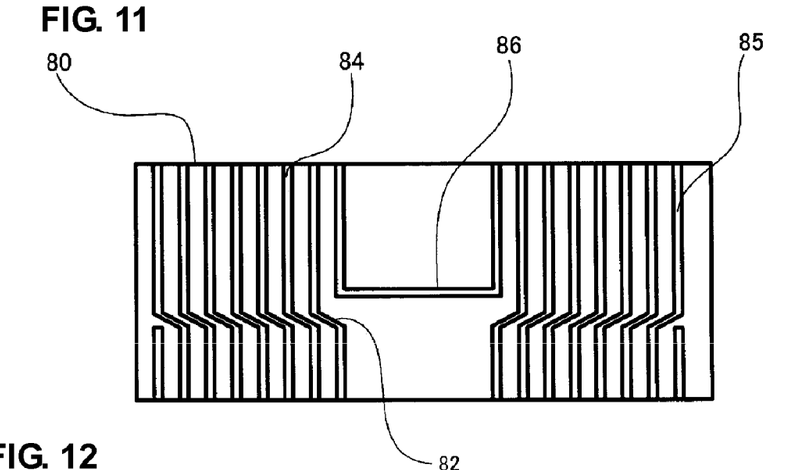
FIG. 11 is a plan view of a flexible substrate according to the ninth preferred embodiment of the present invention.

A ninth preferred embodiment will be described with reference to FIGS. 10 and 11. FIG. 10 is a perspective view of an antenna device 109 that is a ninth preferred embodiment of the present invention. FIG. 11 is a plan view of a flexible substrate defining the antenna device 109 that is the ninth preferred embodiment of the present invention. In this preferred embodiment, a coil conductor is provided on an insulating flexible substrate 80 preferably made of polyimide or other suitable material, and the flexible substrate is wound around a magnetic core 2, whereby a coil is formed. A configuration excluding the coil forming method is substantially the same as that of the second preferred embodiment.

The flexible substrate 80 is wound around a portion of the magnetic core 2 excluding curved portions 20 and 21 disposed at the ends thereof. As shown in FIG. 11, the flexible substrate 80 has a substantially rectangular principal surface. Conductor patterns 84 defining a coil portion A and conductor patterns 85 defining a coil portion B are provided at both sides of the principal surface excluding the central portion so as to connect an upper end and a lower end of the flexible substrate 80. Each of the conductor patterns 84 and 85 includes a bent portion 82 near the approximate center thereof. In addition, two conductor patterns located at innermost locations on the principal surface of the flexible substrate 80 among the conductor patterns 84 and 85 provided on both sides excluding the central portion are connected by a conductor pattern 86 defining a connecting conductor. The conductor patterns 84, 85, and 96 can preferably be formed by screen printing or etching, for example. The flexible substrate 80 is wound around the magnetic core 2 with the surface having the conductor patterns 84 and 85 being inside such that the upper ends and the lower ends of the conductor patterns 84 and 85 defining the coil portion A and the coil portion B sequentially overlap. The overlapping portions are electrically connected, for example, by soldering. In this manner, the conductor patterns 84 and 85 define a series of coils as shown in FIG. 10. Although the conductor patterns 84, 85, 86 are shown as a single line in FIG. 10, the conductor patterns have a predetermined width as shown in FIG. 11. The flexible substrate 80 can preferably be fixed around the magnetic core 2 by soldering or other suitable method. By adhering the flexible substrate 80 on the magnetic core 2 with an adhesive, stable production is possible. The flexible substrate 80 may be wound around the magnetic core 2 so that the surface having the conductor patterns 84 and 85 is located outside. However, when the surface having the conductor patterns 84 and 85 is located inside, the conductor patterns are much less likely to peel off, which is thus more preferable.

Since formation of a coil according to such a method eliminates the need to print conductors on a magnetic core, the coil conductors can be inexpensively formed. In addition, when an electrode is formed directly on a magnetic core, there is a problem in that the Q value of the coils functioning as an antenna decreases. When an insulating flexible substrate having low magnetic permeability is used, the Q value is improved, which is thus more preferable.

In addition, shapes of the conductor patterns 84, 85, and 86 provided on the flexible substrate 80 are not limited to the one described above.

Figure 12:
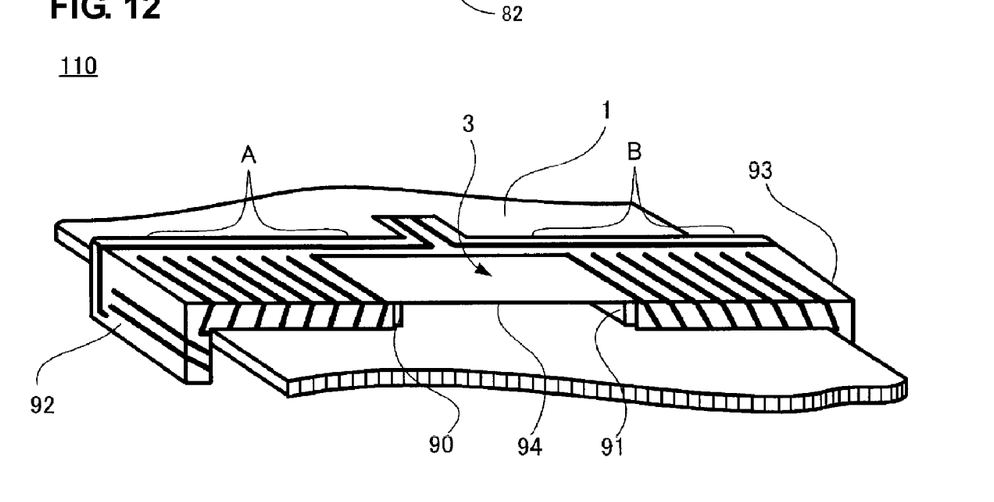
FIG. 12 is a perspective view of an antenna device describing a tenth preferred embodiment of the present invention.
Figure 13:
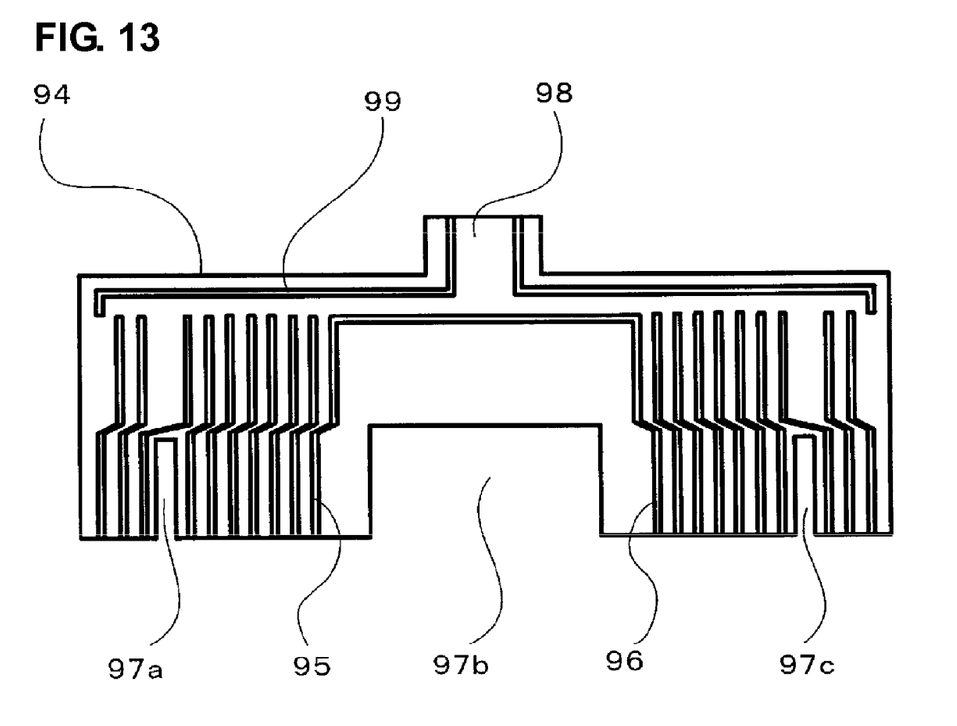
FIG. 13 is a plan view of a flexible substrate according to the tenth preferred embodiment of the present invention.

A tenth preferred embodiment will be described with reference to FIG. 12 and FIG. 13. FIG. 12 is a perspective view of an antenna device 110 that is a tenth preferred embodiment of the present invention. FIG. 13 is a plan view of a flexible substrate defining the antenna device 110 that is the tenth preferred embodiment of the present invention. As in the ninth preferred embodiment, a flexible substrate having coil conductors provided thereon is wound around a magnetic core, whereby a coil is provided in this preferred embodiment. The tenth preferred embodiment is different from the ninth preferred embodiment in that the flexible substrate is also wound around curved portions to form coils and in that the magnetic core is divided into two portions.

The antenna device 110 includes two divided magnetic cores 90 and 91. Curved portions 92 and 93 are provided at the left end of the magnetic core 90 and the right end of the magnetic core 91. One flexible substrate 94 is wound around the magnetic cores 90 and 91. The flexible substrate 94 also covers the curved portions 92 and 93.

As shown in FIG. 13, the flexible substrate 94 includes three notches 97a, 97b, and 97c and one protrusion 98. Conductor patterns 95 defining a coil A and conductor patterns 96 defining a coil B are provided on both sides of a principal surface of the flexible substrate 94 excluding a central portion so as to be connected to a lower end of the flexible substrate 94 but not to be connected to an upper end thereof. The configuration of each conductor pattern is substantially the same as that of the ninth preferred embodiment. A conductor pattern 99 arranged to be connected to a terminal (not shown) is disposed near the upper end of the flexible substrate 94, and extends to an end portion of the protrusion 98 of the flexible substrate 94. A conductor pattern of the protrusion 98 is connected to an external terminal (not shown).

The flexible substrate 94 is bent along the curved portions 92 and 93 of the magnetic cores 90 and 91. Thereafter, the flexible substrate 94 is wound around the magnetic cores 90 and 91 so that upper ends and lower ends of the conductor patterns 95 and 96 defining the coil A and the coil B sequentially overlap. The overlapping portions are electrically connected by soldering, for example. In this manner, the conductor patterns 95 and 96 define a series of coils.

Formation of a coil according to such a method enables coil conductors to be easily formed at the curved portions 92 and 93 of the magnetic core 90 and 91. When the coil conductors are formed at the curved portions 92 and 93, advantages similar to those obtained when the length of the coil is increased can be obtained, and the sensitivity of the antenna can be improved.

Although three notches 97a, 97b, and 97c are preferably provided on the flexible substrate 94 in the antenna device 110, for example, the notches are not necessarily provided. However, since the notch 97b located at the approximate center of the flexible substrate 94 generates a space between the circuit substrate 1 and the flexible substrate 94 and enables other circuit components to be mounted, it is preferable to provide the notch. In addition, since the notches 97a and 97c provided between the conductor patterns 95 defining the coil A and between the conductor patterns 96 defining the coil B facilitate winding of the flexible substrate 94 around the magnetic cores 90 and 91, it is preferable to provide the notches.

As a preferred embodiment of the present invention that is not described in any of the above-described preferred embodiments, a coil portion A and a coil portion B can be connected using a substrate that is different from a circuit substrate 1 in the fifth preferred embodiment shown in FIG. 6. In this case, both of a coil conductor defining the coil portion A and a coil conductor defining the coil portion B is provided on a flexible substrate having the above-described coil conductors thereon. Furthermore, a connecting conductor arranged to connect these coils may be provided on the flexible substrate.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An antenna device comprising:
   an antenna coil including a magnetic core having a first principal surface, a second principal surface facing the first principal surface, and a curved portion at at least one end of the magnetic core, and a coil provided on the first principal surface of the magnetic core, a coil axis of the coil being substantially perpendicular to the first principal surface, and an opening being disposed at the approximate center of the coil; and
   a circuit substrate; wherein
   the antenna coil is arranged to radiate magnetic fluxes;
   the curved portion is curved in a direction such that the magnetic fluxes are bent towards the circuit substrate and paths of the magnetic fluxes extend to sides of the circuit substrate; and
   the antenna coil is arranged such that the second principal surface of the magnetic core faces a mounting surface of the circuit substrate.

2. The antenna device according to claim 1, wherein the curved portion is arranged to extend in a direction along a lateral surface of the circuit substrate.

3. The antenna device according to claim 2, wherein at least a portion of an end surface of the magnetic core is located outside the circuit substrate in a plan view.

4. The antenna device according to claim 1, wherein the antenna coil is mounted on the circuit substrate with a space therebetween.

5. The antenna device according to claim 1, wherein a flexible substrate having an electrode pattern provided thereon is wound around the magnetic core to define the coil.

6. The antenna device according to claim 1, wherein the antenna coil is directly mounted on the circuit substrate.

7. The antenna device according to claim 1, wherein the curved portion is provided at one end of the magnetic core.

8. The antenna device according to claim 1, wherein a plurality of the curved portions is provided at two opposite ends of the magnetic core.

* * * * *